(12) United States Patent
Qian

(10) Patent No.: US 11,097,972 B2
(45) Date of Patent: Aug. 24, 2021

(54) ARRANGEMENT STRUCTURE FOR BUBBLING APPARATUSES OF FURNACE

(71) Applicant: JUSHI GROUP CO., LTD., Tongxiang (CN)

(72) Inventor: Yonggen Qian, Tongxiang (CN)

(73) Assignee: JUSHI GROUP CO., LTD., Tongxiang (CN)

( * ) Notice: Subject to any disclaimer, the term of this patent is extended or adjusted under 35 U.S.C. 154(b) by 168 days.

(21) Appl. No.: 16/093,049

(22) PCT Filed: Sep. 1, 2017

(86) PCT No.: PCT/CN2017/100130
§ 371 (c)(1),
(2) Date: Mar. 19, 2019

(87) PCT Pub. No.: WO2018/054210
PCT Pub. Date: Mar. 29, 2018

(65) Prior Publication Data
US 2019/0210906 A1 Jul. 11, 2019

(30) Foreign Application Priority Data

Sep. 21, 2016 (CN) .......................... 201610835110.9
May 9, 2017 (CN) .......................... 201710321585.0

(51) Int. Cl.
*C03B 5/193* (2006.01)
(52) U.S. Cl.
CPC .................................... *C03B 5/193* (2013.01)
(58) Field of Classification Search
CPC ...................................................... C03B 5/193
(Continued)

(56) References Cited

U.S. PATENT DOCUMENTS 3,015,190 A 10/1953 Arbeit
2,909,005 A * 10/1959 Beck ........................ C03B 5/193
65/178

(Continued)

FOREIGN PATENT DOCUMENTS

CN 102574719 A 7/2012
CN 203513465 U 4/2014
(Continued)

OTHER PUBLICATIONS

International Preliminary Report on Patentability of the International Search Authority for PCT/CN2017/109141 dated Mar. 29, 2019 and its English translation provided by WIPO.
(Continued)

*Primary Examiner* — David L Sorkin
(74) *Attorney, Agent, or Firm* — Anova Law Group, PLLC

(57) ABSTRACT

An arrangement structure for bubbling apparatuses of a furnace, comprising bubbling apparatuses disposed in a melting pool (11) of a furnace. Each bubbling apparatus comprises a bubbling tank (8) and a bubbling tube (9). The bubbling tank (8) is provided at the bottom of the melting pool (11) and disposed in recessed fashion. The bubbling tube (9) is mounted in the bubbling tank (8). The structure can efficiently enhance the physical effect of a bubbling gas on molten glass and improve the quality and production efficiency of the molten glass.

19 Claims, 4 Drawing Sheets

(58) Field of Classification Search
USPC .......................................... 65/134.5; 366/107
See application file for complete search history.

(56) References Cited

U.S. PATENT DOCUMENTS

| | | | |
|---|---|---|---|
| 3,030,736 A | 4/1962 | Penberthy | |
| 3,219,427 A | 11/1965 | Hymowitz | |
| 3,397,973 A | 8/1968 | Rough | |
| 3,414,396 A | 12/1968 | Brichard | |
| 4,019,888 A | 4/1977 | Verhappen et al. | |
| 4,545,800 A * | 10/1985 | Won ...................... | C03B 5/2356 65/134.4 |
| 8,875,544 B2 * | 11/2014 | Charbonneau .......... | F23D 14/20 65/347 |
| 2007/0197366 A1 | 8/2007 | Aoki et al. | |
| 2009/0044569 A1 | 2/2009 | Gorisch et al. | |
| 2013/0072371 A1 * | 3/2013 | Jansen ...................... | C03B 3/00 501/11 |

FOREIGN PATENT DOCUMENTS

| | | |
|---|---|---|
| CN | 103998383 A | 8/2014 |
| CN | 105601087 A | 5/2016 |
| CN | 106477852 A | 3/2017 |
| GB | 1003982 A | 6/2016 |
| JP | H0656433 A | 3/1994 |
| JP | 2002284532 A | 10/2002 |
| RU | 2027684 C1 | 7/1991 |
| WO | 2005037721 A1 | 4/2005 |
| WO | 2013094313 A1 | 6/2013 |

OTHER PUBLICATIONS

First office action for European patent application 17852278.5 dated Nov. 13, 2019.
First office action for Indian patent application 201817046590 dated Sep. 30, 2019.
Second office action for Chinese patent application 201710321585.0 dated Dec. 4, 2019 and its machine translation provided by google translate.
International Search Report PCT/CN2017/100130 dated Dec. 6, 2017 and its English translation provided by WIPO.
Written Opinion of the International Search Authority PCT/CN2017/100130 dated Dec. 6, 2017 and its English translation provided by Google Translate.

* cited by examiner

ARRANGEMENT STRUCTURE FOR BUBBLING APPARATUSES OF FURNACE

CROSS-REFERENCE TO RELATED APPLICATIONS

The present application is the U.S. national phase of PCT Application of PCT/CN2017/100130 filed on Sep. 1, 2017, which claims priority to Chinese Patent Application No. 201610835110.9 filed to State Intellectual Property Office on Sep. 21, 2016 and entitled "ARRANGEMENT STRUCTURE FOR BUBBLING APPARATUSES OF FURNACE" and Chinese Patent Application No. 201710321585.0 filed to State Intellectual Property Office on May 9, 2017 and entitled "ARRANGEMENT STRUCTURE FOR BUBBLING APPARATUSES OF FURNACE", the disclosures of which are incorporated herein by reference in their entireties.

TECHNICAL FIELD OF THE PRESENT INVENTION

The present invention relates to the field of glass furnaces, and in particular to an arrangement structure for bubbling apparatuses of a furnace.

BACKGROUND OF THE PRESENT INVENTION

Bubbling apparatuses of glass fiber furnaces are mostly arranged in a line transversely, that is, the bubbling apparatuses are horizontally arranged in a melting pool at certain intervals and along the lengthwise direction of the melting pool. Bubbling tubes are vertically inserted into bubbling tanks, and the top of each of the bubbling tubes is higher than the bottom plane of the melting pool.

However, in practical applications, such an arrangement has some disadvantages. Firstly, the gas (i.e., bubbles) discharged from the bubbling tubes turns over upward from the orifices of the bubbling tubes. This may lead to ineffective agitation of molten glass on the bottom of the melting pool. Secondly, mechanical agitation effects generated by adjacent bubbles will be counteracted, so the heat exchange, clarification and homogenization of the molten glass effected by the bubbles will be influenced and some irregular convection currents will be generated in severe cases. Thirdly, with the substantial increase in the melting rate of the furnace, the flow of the molten glass is increased correspondingly and the flow rate is also increased continuously. Accordingly, the deficiencies of such an arrangement of the bubbling apparatuses become more obvious. Consequently, it is likely to extend the temperature fluctuation range of the molten glass in a main channel and influence the stable control of the temperature of a bushing forehearth, resulting in the fluctuation in the linear density of fibers or even the temperature decrease of bushings in severe cases.

Chinese Patent No. ZL201320458554.7 disclosed an improved glass melting unit furnace, in which the improved glass melting unit furnace includes a crown and a body, wherein a melting pool is provided in a middle portion of the kiln body; three rows of bubblers are disposed in the melting pool; two rows of bubblers in an upper portion of the melting pool are arranged in adjacent to each other; and, the bubblers in the lowermost portion of the melting pool are disposed at 1/3 height of the melting pool, and the bubblers in the uppermost portion of the melting pool are disposed at 2/3 height of the melting pool. One row of bubblers in the lowermost portion functions to aid in combustion, and two rows of bubblers in the uppermost portion of the melting pool function to refine and homogenize the molten glass. However, the improved glass melting unit furnace has the following deficiencies.

Firstly, since the bubblers are disposed at 1/3 or 2/3 height of the melting pool, the length of the bubbling tubes extending into the melting pool is increased, and the consumptions of precious metals are thus increased.

Secondly, after the length of the bubbling tubes extending into the melting pool is increased, the strength of the bubbling tubes will be decreased at a high temperature, and the bubbling tubes will be bent due to the molten glass flow. As a result, the bubbles are displaced and it is likely to result in fracture of the bubbling tubes.

Furthermore, the temperature of the molten glass gradually increases from the bottom of the melting pool to the top of the melting pool, and its viscosity is reduced due to the rise of the temperature. When the bubblers are arranged at a higher position, the retention time of the bubbling gas in the molten glass is reduced, and the refining efficiency is thus reduced.

SUMMARY OF THE PRESENT INVENTION

To overcome the deficiencies in the prior art, the present invention provides an arrangement structure for bubbling apparatuses of a furnace, which is rational in structural design, easy to operate, safe and practical. The arrangement structure for bubbling apparatuses of a furnace is particularly applied to glass fiber furnaces with a high melting rate.

To solve the above problem, the present invention employs the following technical solutions. An arrangement structure for bubbling apparatuses of a furnace is provided, including bubbling apparatuses disposed in a melting pool of the furnace, wherein each of the bubbling apparatuses includes a bubbling tank and a bubbling tube; the bubbling tank is provided at the bottom of the melting pool and disposed in a recessed fashion; and, the bubbling tube is mounted in the bubbling tank. The arrangement of the bubbling tanks in a recessed fashion means that the bottom plane of each of the bubbling tanks is not higher than the bottom plane of the melting pool. By this design, the distance between the bottom of each of the bubbling apparatuses and the level of the molten glass is increased, and the retention time of bubbles in the molten glass is increased. Accordingly, it is more advantageous for the volume expansion of the gas when heated, the agitation effect of the molten glass is enhanced, and better beneficial effects are achieved.

Wherein, the arrangement structure for bubbling apparatuses of a furnace includes N arrangement sets, each arrangement set includes M rows of bubbling apparatuses, wherein each arrangement set is located at an average position of the M rows of bubbling apparatuses in a lengthwise direction of the melting pool, where both N and M are integers greater than or equal to 1; and the melting pool of the furnace includes the following three position intervals along its length L: [0.277 L, 0.388 L], [0.444 L, 0.555 L] and [0.611 L, 0.722 L], and the N arrangement sets are located within one or more of the three position intervals.

Wherein, at least one set of the N arrangement sets is located at 1/3 length of the melting pool, 1/2 length of the melting pool or 2/3 length of the melting pool.

Wherein, the N arrangement sets are disposed at positions at one or more of a position at 1/3 length of the melting pool, a position at 1/2 length of the melting pool and a position at 2/3 length of the melting pool.

Wherein, the arrangement structure for bubbling apparatuses of a furnace includes two rows of bubbling apparatuses which are located at 1/3 length of the melting pool and 2/3 length of the melting pool.

Wherein, the arrangement structure for bubbling apparatuses of a furnace includes two rows of bubbling apparatuses which are located respectively before and after a position at 1/3 length, or 2/3 length, of the melting pool, and an average position of the two rows of bubbling apparatuses is a position at 1/3 length of the melting pool or a position at 2/3 length of the melting pool.

Wherein, the arrangement structure for bubbling apparatuses of a furnace includes two rows of bubbling apparatuses which are located respectively before and after a position at 1/3 length, or 2/3 length, of the melting pool, and an average position of the two rows of bubbling apparatuses is a position at 1/3 length of the melting pool or a position at 2/3 length of the melting pool.

Wherein, the arrangement structure for bubbling apparatuses of a furnace includes two rows of bubbling apparatuses, which are located respectively before and after a position at 1/3 length, or 2/3 length, of the melting pool, and the two rows of bubbling apparatuses are disposed in a staggered manner and a distance between the two rows is 800 mm to 2,000 mm.

Wherein, the N arrangement sets include N bubbling tanks, and each arrangement set includes M rows of bubbling tubes disposed in a same bubbling tank.

Wherein, the arrangement structure for bubbling apparatuses of a furnace includes two arrangement sets which are disposed at 1/3 and 2/3 of the length of the melting pool, respectively, and M is 1 or 2.

Wherein, the arrangement structure for bubbling apparatuses of a furnace includes two arrangement sets which are disposed before and after 1/3 length of the melting pool, respectively, with a distance between the front and after arrangement sets being 800 mm to 2000 mm, and M is 1 or 2;

or, the two arrangement sets are disposed before and after 2/3 of the length of the melting pool, respectively, with a distance between the front and after arrangement sets being 800 mm to 2000 mm, and M is 1 or 2.

Wherein, the bubbling apparatuses in adjacent rows are disposed in a staggered manner, and a distance between adjacent rows is 800 mm to 2000 mm.

Wherein, the M rows of bubbling tubes are disposed in a staggered manner, and a distance between adjacent rows is 1000 mm to 1800 mm.

Wherein, the bottom of each of the bubbling tanks is 0 mm to 400 mm lower than the bottom plane of the melting pool.

Wherein, the bottom of each of the bubbling tanks is 50 mm to 350 mm lower than the bottom plane of the melting pool.

Wherein, the bottom of each of the bubbling tanks is 100 mm to 350 mm lower than the bottom plane of the melting pool.

Wherein, the top of each of the bubbling tubes is 0 mm to 400 mm lower than the bottom plane of the melting pool.

Wherein, the top of each of the bubbling tubes is 50 mm to 350 mm lower than the bottom plane of the melting pool.

Wherein, the bubbling tubes are arranged in two rows in a staggered manner, a distance between the before and after rows is 800 mm to 2000 mm.

Wherein, the top of each of the bubbling tubes is 100 mm to 300 mm lower than the bottom plane of the melting pool.

Wherein, the top of each of the bubbling tubes is 150 mm to 200 mm lower than the bottom plane of the melting pool.

Wherein, the top of each of the bubbling tubes is 30 mm to 100 mm higher than the bottom of each of the bubbling tanks.

Wherein, the top of each of the bubbling tubes is 100 mm to 300 mm lower than the bottom plane of the melting pool and 30 mm to 100 mm higher than the bottom of each of the bubbling tanks.

Wherein, the bubbling tubes are vertically mounted at the bottom of the bubbling tanks.

Wherein, one row of bubbling tubes closest to a feed inlet is mounted along a direction opposite to the flow direction of the molten glass at a first predetermined angle, the first predetermined angle deviating from a vertical plane by 0° to 40°.

Wherein, the first predetermined angle deviates from the vertical plane by 5° to 40°.

Wherein, the first predetermined angle deviates from the vertical plane by 5° to 30°.

Wherein, the bottom of each of the bubbling tanks in an arrangement set positioned within an position interval [0.305 L, 0.361 L] is 0 mm to 400 mm lower than the bottom plane of the melting pool; and, the bottom of each of the bubbling tanks in an arrangement set positioned within an position interval [0.638 L, 0.694 L] is 0 mm to 350 mm lower than the bottom plane of the melting pool.

Wherein, the positions of the N arrangement sets comprise a position at 1/3 length of the melting pool and a position at 2/3 length of the melting pool, and a recessed distance of the top of each of the bubbling tubes disposed at the position at 1/3 length of the melting pool is greater than a recessed distance of the top of each of the bubbling tubes disposed at the position at 2/3 length of the melting pool, the recessed distance is a distance below the bottom plane of the melting pool.

Wherein, the positions of the N arrangement sets comprise a position at 1/3 length of the melting pool and a position at 2/3 length of the melting pool, and a recessed distance of the bottom of each of the bubbling tanks disposed at the position at 1/3 length of the melting pool is greater than a recessed distance of the bottom of each of the bubbling tanks disposed at the position at 2/3 length of the melting pool, the recessed distance is a distance below the bottom plane of the melting pool.

Wherein, a distance between adjacent bubbling tubes in a same row of bubbling tubes is 300 mm to 800 mm.

Wherein, a distance between adjacent bubbling tubes in a same row of bubbling tubes is 400 mm to 600 mm.

In the arrangement structure for bubbling apparatuses of a furnace in the present invention, the bubbling apparatuses are arranged in a recessed fashion, and the bubbling tubes are mounted within the bubbling tanks, wherein the bottom of each of the bubbling tanks is 0 mm to 400 mm (preferably 50 mm to 350 mm, more preferably 100 mm to 350 mm) lower than the bottom plane of the melting pool.

Moreover, bubbling tube holes are designed on the bottom of the bubbling tanks, the bubbling tubes are disposed within the bubbling tanks, and the bubbling tubes are also preferably arranged in a recessed fashion. That is, the top of each of the bubbling tubes is not higher than the bottom plane of the melting pool. By this design, the defects that the strength of the bubbling tubes will be reduced at a high temperature and the bubbling tubes bent or fractured due to the molten glass are overcome effectively. The top of each of the bubbling tubes is 0 mm to 400 mm (preferably 50 mm to 350 mm, more preferably 100 mm to 300 mm) lower than the bottom plane of the melting pool.

In some examples, the bottom of each of the bubbling tanks is 130 mm to 400 mm lower than the bottom plane of the melting pool, and the top of each of the bubbling tubes is 100 mm to 300 mm lower than the bottom plane of the melting pool. More preferably, the bottom of each of the bubbling tanks is 180 mm to 300 mm lower than the bottom plane of the melting pool, and the top of each of the bubbling tubes is 150 mm to 200 mm lower than the bottom plane of the melting pool.

After the bottom of each of the bubbling tanks is designed to be lower than the bottom plane of the melting pool, the area of the melting pool remains unchanged, and the volume of the molten glass is increased. Accordingly, on one hand, the replacement rate is reduced; and on the other hand, the distance between the bottom of each of the bubbling tanks and the level of the molten glass is increased, and the retention time of the bubbles in the molten glass is increased, so that it is advantageous for the volume expansion of the gas when heated, the mechanical agitation efficiency of the molten glass is enhanced, and the clarification and homogenization of the molten glass are improved.

However, when the recessed distance of the bottom of each of the bubbling tanks relative to the bottom of the melting pool is greater than the above value range, the distance between the top of each of the bubbling tubes and the level of the molten glass will be further increased. In this case, it is necessary to take the temperature drop of the molten glass into consideration. If the temperature drop is too fast, the viscosity of the molten glass will be too high, so that it is disadvantageous for bubbling gas to vertically penetrate through the molten glass, and the bubbling gas will deviate from its original path and form a displacement. Therefore, by fully considering the temperature drop and the change in viscosity of the molten glass, the bubbling tanks are recessed by 0 mm to 400 mm. In this way, the mechanical agitation efficiency of bubbles can be enhanced and the vertical penetration of bubbles through the molten glass can also be taken into account. The above preferred value range further enhances the beneficial effects of the recessed arrangement.

Further, in combination with the recessed design of the bubbling tanks, the bubbling apparatuses are controlled to be arranged in a certain combinated arrangements, so that the physical action of the bubbling gas on the molten glass can be effectively enhanced and the clarification and homogenization effects of the molten glass are improved.

Unlike the transverse arrangement of bubbling tanks in a line in the prior art, the bubbling apparatuses in the present invention are vertically arranged at certain intervals along a direction perpendicular to the length of the melting pool. In this arrangement structure, bubbling apparatuses in a same row share a same bubbling tank. In other words, a bubbling tank is disposed below the bottom of the melting pool in a recessed manner, a row of bubbling tube holes are formed at the bottom of the bubbling tank, and the bubbling tubes are mounted within the bubbling tube holes. Therefore, it should be understood by those skilled in the art that the top of each of the bubbling tubes in the present invention should be higher than or flush with the bottom of the bubbling tank. Moreover, the position of a certain row of bubbling apparatuses refers to a position of a connecting line of central points of this row of bubbling tubes relative to the lengthwise direction of the furnace.

Specifically, the arrangement structure for bubbling apparatuses of a furnace includes N arrangement sets, each arrangement set including M rows of bubbling apparatuses, wherein each arrangement set is disposed at an average position of the positions of the M rows of bubbling apparatuses in a lengthwise direction of the melting pool, wherein both N and M are integers greater than or equal to 1. Since the position of a certain row of bubbling apparatuses refers to a position of a connecting line of central points of this row of bubbling tubes in the lengthwise direction of the furnace, the position of each arrangement set is an average position of the positions of the M rows of bubbling apparatuses, i.e., an average position of a connecting line of central points of M bubbling tubes forming this arrangement set in the lengthwise direction of the furnace.

Furthermore, there are three position intervals in the length L of the melting pool of the furnace: [0.277 L, 0.388 L], [0.444 L, 0.555 L] and [0.611 L, 0.722 L], and the N arrangement set are positioned within one or more of the three position intervals, so that it is advantageous to achieve various beneficial effects such as melting acceleration, clarification and homogenization. In the present invention, the position is calculated in a direction from a throat to a feed inlet. For example, a position interval [0.227 L, 0.338 L] refers to a position range between a position where the distance to the throat is 27.7% length of the melting pool and a position where the distance to the throat is 38.8% length of the melting pool.

Preferably, at least one set of the N arrangement set is disposed at 1/3, 1/2 or 2/3 length of the melting pool.

The position at 1/3, 1/2 or 2/3 length of the melting pool refers to a position obtained by trisection or bisection of the length of the melting pool. In the present invention, the position at 1/3 length of the melting pool refers to a position whose distance to the throat is 1/3 length of the melting pool.

Further, the positions of the N arrangement sets include one or more of the following: a position at 1/3 length of the melting pool, a position at 1/2 length of the melting pool and a position at 2/3 length of the melting pool, wherein each arrangement set is disposed at an average position of the positions of the M rows of bubbling apparatuses in the lengthwise direction of the melting pool.

It has been found by studies that, when the bubbling apparatuses are disposed at 1/3 length of the melting pool, the bubbling apparatuses can improve the agitation effect of the molten glass, and high-quality molten glass can be ensured. When the bubbling apparatuses are disposed at 2/3 length of the melting pool, the bubbling apparatuses can function to obstruct the material, increase the diffusion coefficient of the material layer and thus accelerate the melting of the mixed batch. When the bubbling apparatuses are disposed at 1/2 length of the melting pool, the bubbling apparatuses can enhance the heat exchange of the molten glass, accelerate the formation of glass, and shorten the time for clarification and homogenization of the molten glass.

Therefore, the arrangement structure for bubbling apparatuses of a furnace in the present invention can include an arrangement set which is disposed at any one of 1/3, 1/2 and 2/3 length of the melting pool. By designing a recessed bubbling arrangement set at the above predetermined position, the retention time of bubbles in the molten glass can be increased, the physical action on the molten glass at this position can be enhanced, and the clarification and homogenization effects of glass can be effectively improved. Furthermore, the arrangement set can include one or more rows of bubbling apparatuses, so that the bubbling effect can be further improved.

Particularly, when the arrangement set disposed at 2/3 length of the melting pool includes two or more rows of bubbling apparatuses, the material obstruction effect can be realized; moreover, the multi-row bubbling design can thin the material layer, improve the acceptance and uniformity of heat applied to the material layer, and quicken the melting of the mixed batch. When the arrangement set disposed at 1/3 length of the melting pool includes two or more rows of bubbling apparatuses, better homogenization and clarification effects can be ensured.

Similarly, the arrangement structure for bubbling apparatuses of a furnace in the present invention can include two arrangement sets which are disposed at any two of 1/3, 1/2 and 2/3 length of the melting pool, and each arrangement set includes one or more rows of bubbling apparatuses. The arrangement structure for bubbling apparatuses of a furnace in the present invention can include three arrangement sets which are disposed at 1/3, 1/2 and 2/3 length of the melting pool, respectively, and each arrangement set includes one or more rows of bubbling apparatuses.

By arranging bubbling apparatuses at the above particular positions in a recessed manner, both the bubbling effect and the quality of the molten glass are greatly improved in comparison with those of the prior art. More bubbling apparatuses will realize better bubbling effect, at the expense of correspondingly increased cost. By comprehensively considering the bubbling effect and the equipment cost, in the technical solutions of the present invention, the arrangement structure for bubbling apparatuses of a furnace is configured in the following ways.

When the bubbling structure for the furnace includes two rows of bubbling apparatuses, the two rows of bubbling apparatuses are respectively disposed at 1/3 and 2/3 length of the melting pool, or respectively disposed at positions before and after 1/3 length of the melting pool, or respectively disposed at positions before and after 2/3 length of the melting pool. When the two rows of bubbling apparatuses are disposed before and after a predetermined position, preferably, the predetermined position is an average position of the two rows of bubbling apparatuses.

When the bubbling structure for the furnace includes four rows of bubbling apparatuses, the four rows of bubbling apparatuses can form two arrangement sets. Preferably, the two arrangement sets are disposed at 1/3 and 2/3 length of the melting pool, respectively, with one row of bubbling apparatuses disposed on each side of each position. Or, the four rows of bubbling apparatuses form one arrangement set disposed at 1/3 or 2/3 length of the melting pool; or, the four rows of bubbling apparatuses form two arrangement sets which are respectively disposed at positions before and after 1/3 length of the melting pool, or respectively disposed at positions before and after 2/3 length of the melting pool. A distance between the two arrangement sets is controlled to be 800 mm to 2000 mm. That is, two rows of bubbling apparatuses are arranged on each side of the predetermined position, so that a certain bubbling region formed by the bubbling apparatuses is arranged at the position in a centralized manner.

When the bubbling structure for the furnace includes five rows of bubbling apparatuses, preferably, as an arrangement mode of the five rows of bubbling apparatuses, based on the above arrangement mode of the four rows of bubbling apparatuses, one row of bubbling apparatuses are additionally disposed at 1/2 length of the melting pool.

The counteraction of the mechanical effects generated by adjacent bubbling gas is a common technical problem in the prior art. In the present invention, the distance between the adjacent rows of bubbling apparatuses is controlled to be 800 mm to 2000 mm, preferably 1000 mm to 1800 mm. More preferably, adjacent rows of bubbling apparatuses are arranged in a staggered manner, that is, in a direction opposite to the flow direction of the molten glass, a certain bubbling tube in one row and two bubbling tubes in another row are staggered to form a triangular shape. Accordingly, the distance between the two rows of bubbling tubes is increased, and the agitation area of the molten glass formed by bubbles is also increased due to the staggered arrangement of front and rear rows. It is advantageous for the heat exchange of the molten glass, the melting of material and the formation of glass are quickened, the tendency of stratification of the molten glass is reduced, and the homogeneity of the molten glass is improved.

Further, the distance between adjacent bubbling tubes in a same row of bubbling tubes is controlled to be 300 mm to 800 mm, preferably 400 mm to 600 mm. By increasing the spacing around the bubbling pips, the counteraction of the mechanical agitation effects generated by adjacent bubbling gas is reduced effectively, so that the retention time of bubbles in the molten glass is increased and the clarification efficiency is improved.

As another innovation of the present invention, the N arrangement sets include N bubbling tanks, and each arrangement set includes M rows of bubbling tubes disposed in a same bubbling tank. In each arrangement set, a bubbling tank is designed below the bottom of the melting pool in a recessed fashion, and M rows bubbling tubes are disposed within the bubbling tank. In this design, by arranging multiple rows of bubbling tubes in a bubbling tank, the mechanical agitation of the molten glass in the melting pool is enhanced; and, the area of the bubbling tank is increased, the exchange of the molten glass in upper and lower layers in the bubbling tank is accelerated, and the stratification of the molten glass is reduced.

Preferably, the distance between two adjacent rows of bubbling tubes is controlled to be 1000 mm to 1800 mm. By the preferred distance between rows of bubbling tubes, the reduction of interference between bubbles from the two rows of bubbling tubes is taken into consideration, and the bubbling efficiency is improved. After the volume of the bubbling tank is increased, the volume of the molten glass in the tank is relatively increased. Therefore, a larger amount of molten glass can be received in the bubbling tank, and the replacement rate can be reduced. Moreover, by dropping temperature of the molten glass in the bubbling tank, it is advantageous to prolong the service life of the bubbling tubes and the bubbling tank bricks.

Further, the bubbling tubes are vertically mounted within bubbling tube holes formed on the bottom of the bubbling tank. As another innovation of the present invention, one row of bubbling tubes closest to a feed inlet is mounted in a direction opposite to the flow direction of the molten glass at a first predetermined angle, the first predetermined angle deviating from a vertical plane by 0° to 40°. By providing, close to the feed inlet, one row of bubbling tubes obliquely mounted in a direction opposite to the flow direction of the molten glass, the material obstruction is enhanced, and the acceptance and uniformity of heat applied to the material layer are improved. The angle deviating from the vertical plane is preferably 5° to 40°, more preferably 5° to 30°.

As another innovation of the present invention, studies on the subsidence degree of the bubbling apparatuses disposed at different positions of the melting pool are carried out in the present invention. Each of the bubbling apparatuses includes a bubbling tube and a bubbling tank, and the difference between the position of the bubbling tube and the position of the bubbling tank determines the extension length of the bubbling tube and thus relates to the amount of noble metal used and the safety issue. Studies on the arrangement of bubbling apparatuses at different positions are carried out in the application.

Specifically, studies on recessing position of the bubbling tubes relative to the bottom plane of the melting pool are carried out. The subsidence degree of the bubbling tubes is related to the viscosity of the molten glass and the bubbling efficiency. Higher subsidence degree of the bubbling tubes leads to longer retention time of the bubbling gas in the molten glass. However, if the subsidence degree of the bubbling tubes is too high, it is disadvantageous for the vertical penetration of the bubbling gas through the molten glass. Therefore, in the present invention, the position interval [0.611 L, 0.722 L] is a region for raw glass material, at this region the temperature of the glass material is relatively low. By comprehensively considering the bubbling efficiency and the viscosity of the molten glass, it is appropriate that the subsidence degree of the bubbling tubes relative to the bottom plane of the melting pool is not too high, so that the vertical penetration of the bubbling gas through the molten glass can be effectively realized and the bubbling efficiency can be improved. The material within the position interval [0.277 L, 0.388 L] mostly becomes molten glass with a higher temperature, so a high subsidence degree of the bubbling tubes should be realized in order to prolong the retention time of the bubbling gas in the molten glass.

On the other hand, studies on the recessing position of the bubbling tanks relative to the bottom plane of the melting pool are also carried out. The subsidence degree of the bubbling tanks is related to the drop in temperature of the molten glass and the glass capacity of the furnace. The recessing of the bubbling tanks can effectively increase the glass capacity of the furnace and improve the quality of the molten glass. When considering the subsidence degree of the bubbling tanks, it should also take the overall temperature of the molten glass along the length of the melting pool and the drop in temperature resulted from the recessing design into consideration. If the subsidence degree of the bubbling tanks is too high, it is likely to increase the risk of crystallization of the molten glass. Moreover, the subsidence degree of the bubbling tanks directly influences the distance of the bubbling tubes higher than the bottoms of the bubbling tanks. This distance relates to the safety in use of the bubbling tubes and other problems.

Therefore, when the arrangement structure for bubbling apparatuses of a furnace in the present invention includes an arrangement set within a position interval [0.227 L, 0.338 L], or further, a position interval [0.305 L, 0.361 L], the setting parameters for the bubbling apparatuses at this position interval are generally as follows: the bottom of each of the bubbling tanks is 0 mm to 400 mm (preferably 50 mm to 350 mm) lower than the bottom plane of the melting pool, and correspondingly, the top of each of the bubbling tubes is 0 mm to 400 mm (preferably 50 mm to 350 mm) lower than the bottom plane of the melting pool; and, when the arrangement structure for bubbling apparatuses of a furnace in the present invention includes an arrangement set within a position interval [0.611 L, 0.388 L], or further, a position interval [0.638 L, 0.694 L], in this arrangement set at this position interval, the bottom of each of the bubbling tanks is 0 mm to 350 mm (preferably 50 mm to 300 mm) lower than the bottom plane of the melting pool, and correspondingly, the top of each of the bubbling tubes is 0 mm to 350 mm (preferably 50 mm to 300 mm) lower than the bottom plane of the melting pool.

When the arrangement structure for bubbling apparatuses of a furnace in the present invention includes arrangement sets disposed at 1/3 and 2/3 length of the melting pool, preferably, a recessed distance of the top of each of the bubbling tubes in the arrangement set disposed at 1/3 length of the melting pool relative to the bottom plane of the melting pool is controlled to be greater than a recessed distance at 2/3 length of the melting pool. More preferably, by using the bottom plane of the melting pool as reference plane, the top of each of the bubbling tubes at 1/3 length of the melting pool is 50 mm to 200 mm lower than the top of each of the bubbling tubes at 2/3 length of the melting pool. Further, the bottom of each of the bubbling tanks at 1/3 length of the melting pool is controlled to be 0 mm to 200 mm lower than the bottom of each of the bubbling tanks at 2/3 length of the melting pool.

Or, preferably, a recessed distance of the bottom of each of the bubbling tanks in the arrangement set disposed at 1/3 length of the melting pool relative to the bottom plane of the melting pool is controlled to be greater than a recessed distance of the bottom of each of the bubbling tanks at 2/3 length of the melting pool. More preferably, by using the bottom plane of the melting pool as reference plane, the bottom of each of the bubbling tanks at 1/3 length of the melting pool is 50 mm to 150 mm lower than the bottom of each of the bubbling tanks at 2/3 length of the melting pool. Further, the top of the bubbling tubes at 1/3 length of the melting pool is controlled to be 0 mm to 200 mm lower than the top of each of the bubbling tubes at 2/3 length of the melting pool.

By adjusting the subsidence degree of the bubbling tanks and the bubbling tubes according to the furnace structure and the actual change in temperature of the molten glass, the efficiency of melting and clarification can be further improved, and the bubbling effect can be enhanced.

In the arrangement structure for bubbling apparatuses of a furnace in the present invention, bubbling tanks are designed at the bottom of the melting pool, the bubbling tanks are recessed relative to the bottom plane of the melting pool, and the arrangement of the recessed bubbling apparatuses is optimized. The present invention has the characteristics of rational design, simple operation, safety in use and the like, and also has the following advantages in comparison with the prior art.

Firstly, the retention time of bubbles in the molten glass is increased, the counteraction of the mechanical agitation force generated by adjacent bubbles is effectively reduced, the mechanical agitation efficient of the molten glass is enhanced, and the clarification and homogenization effects of the molten glass are improved.

Secondly, the insertion depth of the bubbling tubes into the bubbling tanks is effectively controlled and the bubbling tubs will not be bent or fractured, and the use amount of noble metals is also reduced.

Thirdly, by decreasing temperature of the molten glass in the bubbling tanks, it is advantageous to prolong the service life of the bubbling tubes and the bubbling tank bricks.

Other characteristics, features and advantages of the present invention will become clear by reading the following description of embodiments with reference to the accompanying drawings.

BRIEF DESCRIPTION OF THE DRAWINGS

The accompanying drawings incorporated into the description and constituting a part of the description show the embodiments of the present invention, and are used for explaining the principle of the present invention in combination with the description. In these accompanying drawings, similar reference numerals represent similar elements. The accompanying drawings described hereinafter are some of but not all of the embodiments of the present invention. A person of ordinary skill in the art can obtain other drawings according to these accompanying drawings without paying any creative effort.

REFERENCE NUMERALS

FIGS. 1-10:

1: central line of the furnace; 2: feed inlet; 3: throat; 4: furnace flue; 5: flow direction of the molten glass; 6: schematic diagram of bubbling gas; 7: liquid level line; 8: bubbling tank; 9: bubbling tube; 10: wall of the melting pool; 11: bottom of the melting pool; 12: flow direction of the bubbling gas; 101: position at 1/3 length of the melting pool; 102: position at 2/3 length of the melting pool; and, 103: position at 1/2 length of the melting pool.

DETAILED DESCRIPTION OF THE PRESENT INVENTION

To make the objectives, technical solutions and advantages of the embodiments of the present invention clearer, the technical solutions in the embodiments of the present invention will be described clearly and completely with reference to the accompanying drawings in the embodiments of the present invention. Apparently, the described embodiments are just some but not all of the embodiments of the present invention. All other embodiments obtained by a person of ordinary skill in the art based on the embodiments of the present invention without paying any creative effort shall fall into the protection scope of the present invention. It is to be noted that the embodiments in the present application and the features in the embodiments can be combined at will if not conflicted.

Embodiment 1

Figure 1:
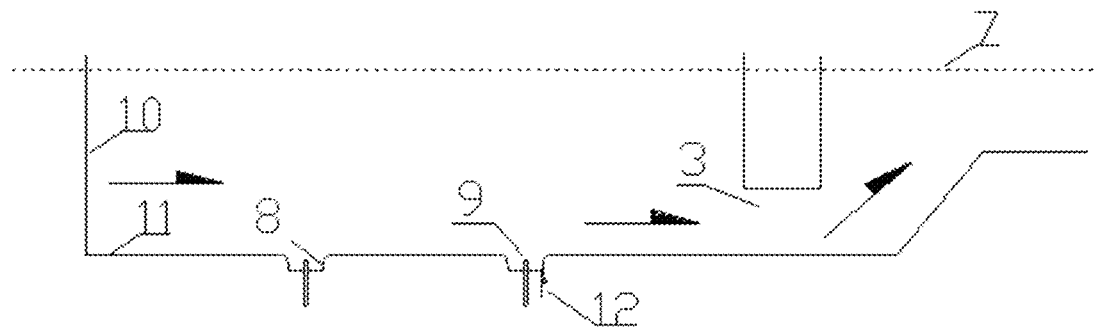
FIG. 1 is a sectional view of an arrangement structure for bubbling apparatuses of a furnace in Embodiment 1.
Figure 2:
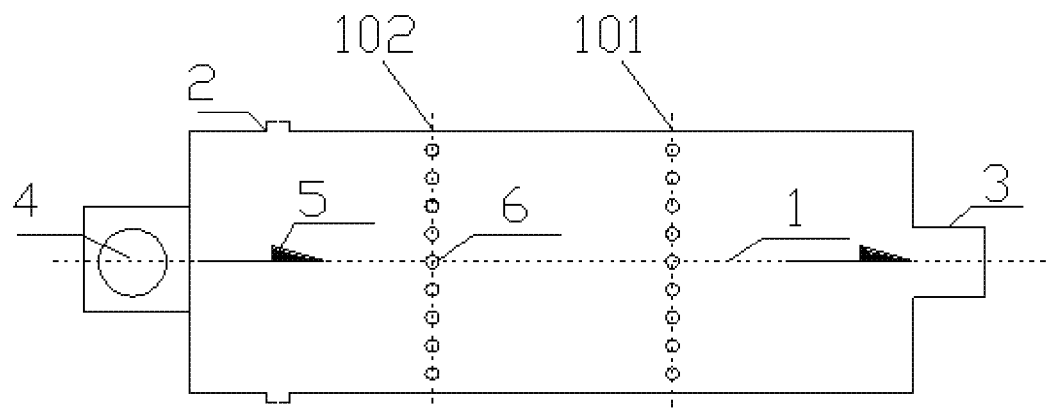
FIG. 2 is a schematic diagram of the arrangement structure for bubbling apparatuses of a furnace in Embodiment 1.

An arrangement structure for bubbling apparatuses of a furnace is provided. Referring to FIGS. 1 and 2, the bubbling apparatuses are disposed in two rows at a position at 1/3 length of a melting pool and a position at 2/3 length of the melting pool (positions 101 and 102 shown in FIG. 1), respectively, and are arranged in a recessed fashion. The top of each of bubbling tubes 9 is 100 mm lower than the bottom plane 11 of the melting pool and 30 mm higher than the bottom of each of bubbling tanks 8. The distance between adjacent bubbling tubes in a same row of bubbling apparatuses is 600 mm.

Embodiment 2

Differences between this embodiment and Embodiment 1 lie in that: the top of each of the bubbling tubes 9 is 150 mm lower than the bottom plane 11 of the melting pool and 100 mm higher than the bottom of each of the bubbling tanks 8, and the distance between adjacent bubbling tubes in a same row of bubbling apparatuses is 300 mm.

Embodiment 3

Figure 3:
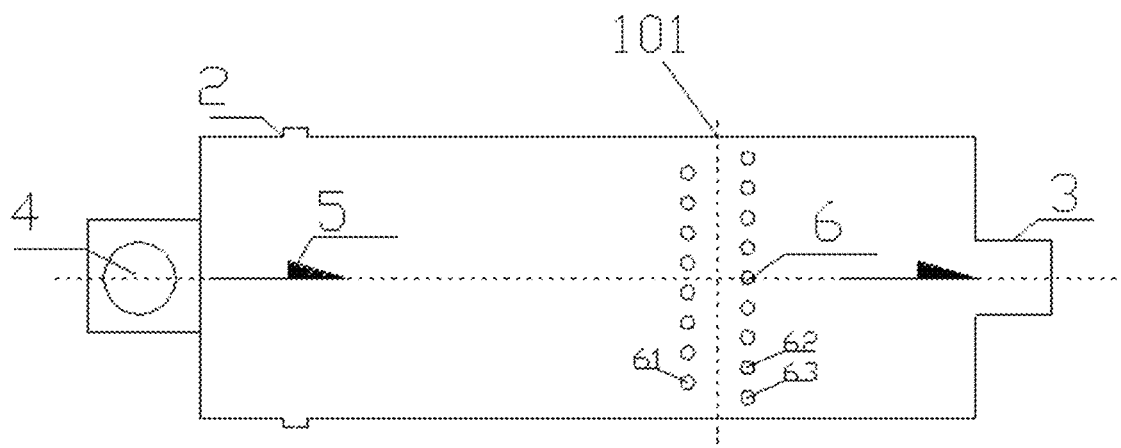
FIG. 3 is a schematic diagram of the arrangement structure for bubbling apparatuses of a furnace in Embodiments 3 and 5.
Figure 4:
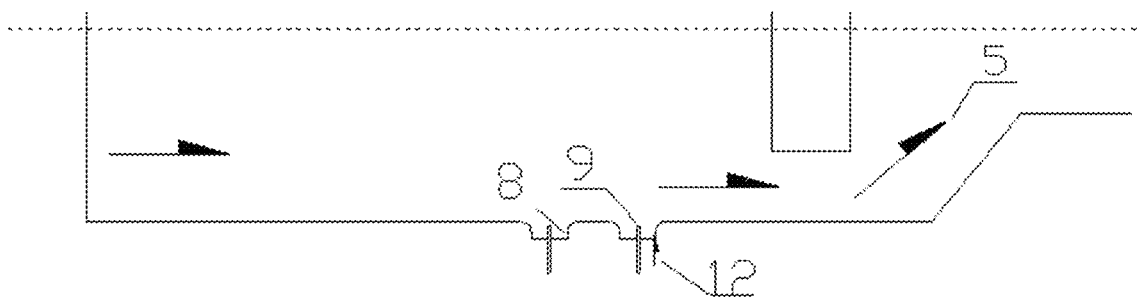
FIG. 4 is a sectional view of the arrangement structure for bubbling apparatuses of a furnace in Embodiment 3.

Referring to FIGS. 3 and 4, the bubbling apparatuses are disposed in two rows before and after the position at 1/3 length of the melting pool, respectively; the front and rear rows of bubbling apparatuses are arranged in a staggered manner with a distance of 1200 mm therebetween; and, central lines of the bubbling tubes 9 in the two rows of bubbling apparatuses are located at positions 600 mm before and after 1/3 length of the melting length, respectively. The bubbling apparatuses are arranged in a recessed fashion. The top of each of the bubbling tubes 9 is 200 mm lower than the bottom plane 11 of the melting pool, and the distance between adjacent bubbling tubes 9 in a same row of bubbling apparatuses is 500 mm. The staggered arrangement of the two rows of bubbling apparatuses means that a bubbling tube in a direction opposite to the flow direction of the molten glass and two bubbling tubes in the other row are staggered to form a triangle shape. Still referring to the FIG. 3, in the staggered arrangement, a bubble 61 is staggered with a bubble 62 and a bubble 63 from the bubbling tubes in the other row to form a triangle shape.

Embodiment 4

The bubbling apparatuses are disposed in two rows before and after the position at 2/3 length of the melting pool, and the front and rear rows of bubbling apparatuses are arranged in a staggered manner with a distance of 2000 mm therebetween. The bubbling apparatuses are arranged in a recessed fashion. The top of each of the bubbling tubes 9 is 200 mm lower than the bottom plane 11 of the melting pool, and the distance between adjacent bubbling tubes 9 in a same row of bubbling apparatuses is 400 mm.

Embodiment 5

Figure 5:
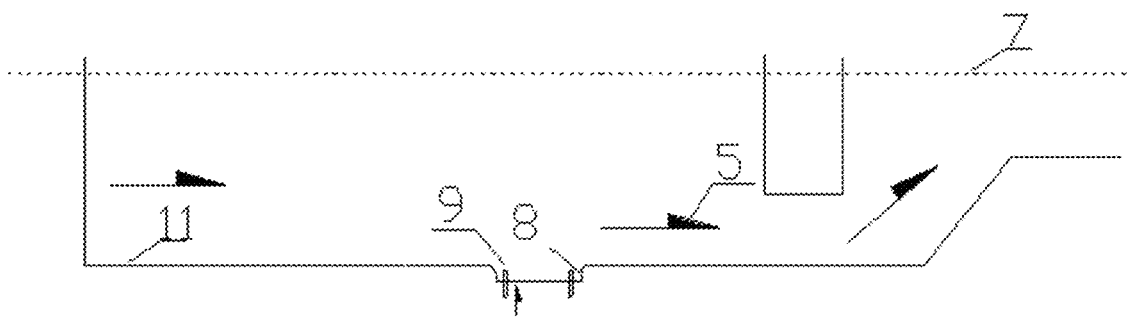
FIG. 5 is a sectional view of the arrangement structure for bubbling apparatuses of a furnace in Embodiment 5.

An arrangement structure for bubbling apparatuses of a furnace is provided. Referring to FIGS. 3 and 5, the bubbling apparatuses are disposed in two rows before and after a position at 1/3 length of the melting pool (a position at 1/3 length from a throat 3 to a feed inlet 2, i.e., the position 101 shown in FIG. 3). The bubbling tanks 8 are arranged in a recessed fashion. Each of the bubbling tanks 8 is 400 mm lower than the bottom plane 11 of the melting pool. Two rows of bubbling apparatuses are disposed within a same bubbling tank, that is, two rows of bubbling tubes 9 are vertically inserted into reserved holes formed on the bottom of the bubbling tank 8. The top of each of the bubbling tubes is 300 mm lower than the bottom plane of the melting pool.

Meanwhile, the two rows of bubbling tubes are arranged in a staggered manner with a distance of 800 mm therebetween. Central lines of the bubbling tubes are located at 4000 mm before and after the position at 1/3 length of the melting pool, and the distance between adjacent bubbling tubes 9 in a same row of bubbling apparatuses is 300 mm.

Embodiment 6

Figure 6:
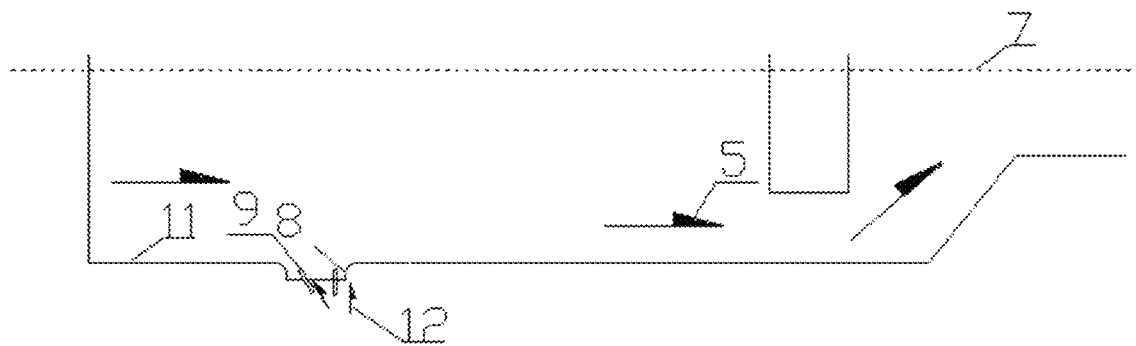
FIG. 6 is a sectional view of the arrangement structure for bubbling apparatuses of a furnace in Embodiment 6.

Referring to FIG. 6, the bubbling apparatuses are disposed in two rows before and after a position at 2/3 length of the melting pool, respectively. The bubbling tanks 8 are arranged in a recessed fashion. Each of the bubbling tanks 8 is 300 mm lower than the bottom plane 11 of the melting pool. Two rows of bubbling apparatuses are disposed within a same bubbling tank, and two rows of bubbling tubes are arranged in a staggered manner before and after the position at 2/3 length of the melting pool. Central lines of the bubbling tubes are located at 500 mm before and after the position at 2/3 length of the melting pool, respectively, and the distance between the two rows of bubbling tubes is 1000 mm. One row of bubbling tubes 9 close to the feed inlet 2 are obliquely mounted within reserved holes formed on the bottom of the bubbling tank 8 in a direction opposite to the flow direction of the molten glass and the angle between the oblique bubbling tube and a vertical plane is 30°. Bubbling tubes 9 in one row away from the feed inlet 2 are vertically inserted into reserved holes formed on the bottom of the bubbling tank 8. The top of each of the bubbling tubes 9 is 250 mm lower than the bottom plane of the melting pool, and the distance between adjacent bubbling tubes 9 in a same row of bubbling tubes 9 is 800 mm.

Embodiment 7

Figure 7:
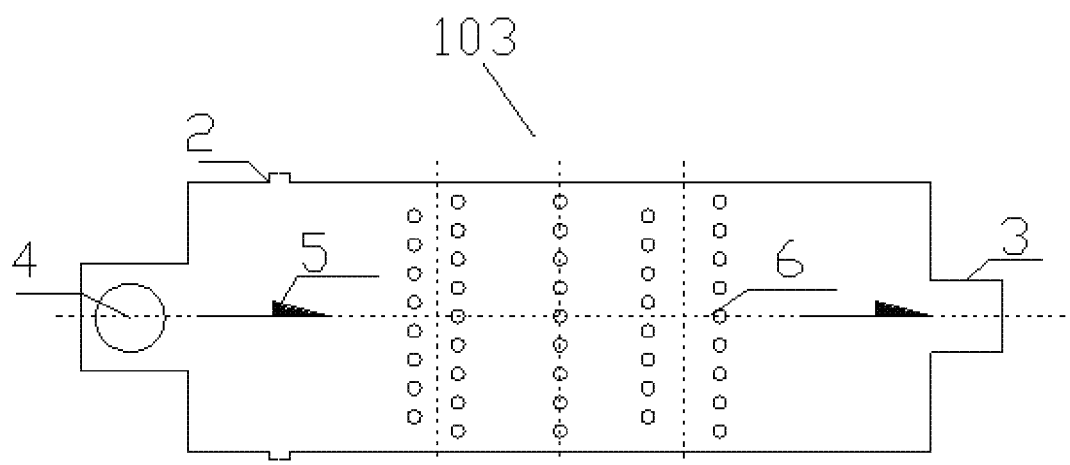
FIG. 7 is a schematic diagram of the arrangement structure for bubbling apparatuses of a furnace in Embodiment 12.

The bubbling apparatuses are disposed, in the melting pool of the furnace, at a position at 1/2 length of the melting pool (a middle position along the length of the melting pool, i.e., the position 103 shown in FIG. 7). The bubbling tanks 8 are arranged in a recessed fashion, and each of the bubbling tanks 8 is 350 mm lower than the bottom plane of the melting pool. A row of bubbling tubes 9 is disposed at the central position at 1/2 length of the melting pool and vertically mounted on the bottoms of the bubbling tanks 8. The top of each of the bubbling tubes 9 is 300 mm lower than the bottom plane of the melting pool.

Embodiment 8

The bubble arrangement structure for a furnace includes two arrangement sets which are disposed at a position at 1/3 length of the melting pool and a position at 2/3 length of the melting pool, respectively. Bubbling tanks in the two arrangement sets are 320 mm lower than the bottom plane of the melting pool. The top of each of the bubbling tubes 9 disposed at 1/3 length of the melting pool is 300 mm lower than the bottom plane of the melting pool, and the top of each of the bubbling tubes 9 disposed at 2/3 length of the melting pool is 100 mm lower than the bottom plane of the melting pool. Each arrangement sets consists of two rows of bubbling tubes which are arranged within a bubbling tank in a staggered manner with a distance of 1200 mm therebetween, and central lines of the two rows of bubbling tubes 9 are located at 600 mm before and after the position at 1/3 length or 2/3 length of the melting pool, respectively. The distance between adjacent bubbling tubes 9 in a same row of bubbling tubes is 500 mm.

Embodiment 9

The bubble arrangement structure for a furnace includes two arrangement sets which are disposed at a position at 1/3 length of the melting pool and a position at 2/3 length of the melting pool, respectively. Bubbling tanks in the two arrangement sets are 220 mm lower than the bottom plane of the melting pool. The top of each of the bubbling tubes 9 disposed at 1/3 length of the melting pool is 200 mm lower than the bottom plane of the melting pool, and the top of each of the bubbling tubes 9 disposed at 2/3 length of the melting pool is 50 mm lower than the bottom plane of the melting pool. Each arrangement sets consists of two rows of bubbling tubes which are arranged within a bubbling tank in a staggered manner with a distance of 2000 mm therebetween, and central lines of the two rows of bubbling tubes 9 are located at 1000 mm before and after the position at 1/3 length or 2/3 length of the melting pool, respectively. The distance between adjacent bubbling tubes 9 in a same row of bubbling tubes is 600 mm.

Embodiment 10

Differences between this embodiment and Embodiment 8 lie in that: the top of each of the bubbling tubes 9 in the two arrangement sets is 100 mm lower than the bottom plane of the melting pool; the bubbling tank disposed at 1/3 length of the melting pool is 250 mm lower than the bottom plane of the melting pool, and the bubbling tank disposed at 2/3 length of the melting pool is 150 mm lower than the bottom plane of the melting pool; central lines of the two rows of bubbling tubes 9 in each arrangement sets are located at 800 mm before and after the position at 1/3 length or 2/3 length of the melting pool, respectively; and, the distance between adjacent bubbling tubes 9 in a same row of bubbling tubes is 400 mm.

Embodiment 11

Differences between this embodiment and Embodiment 8 lie in that: the top of each of the bubbling tubes 9 in the two arrangement sets is 120 mm lower than the bottom plane of the melting pool; the bubbling tank disposed at 1/3 length of the melting pool is 300 mm lower than the bottom plane of the melting pool, and the bubbling tank disposed at 2/3 length of the melting pool is 150 mm lower than t the bottom plane of the melting pool; central lines of the two rows of bubbling tubes 9 in each arrangement sets are located at 900 mm before and after the position at 1/3 length or 2/3 length of the melting pool, respectively; and, the distance between adjacent bubbling tubes 9 in a same row of bubbling tubes is 350 mm.

Embodiment 12

Figure 8:
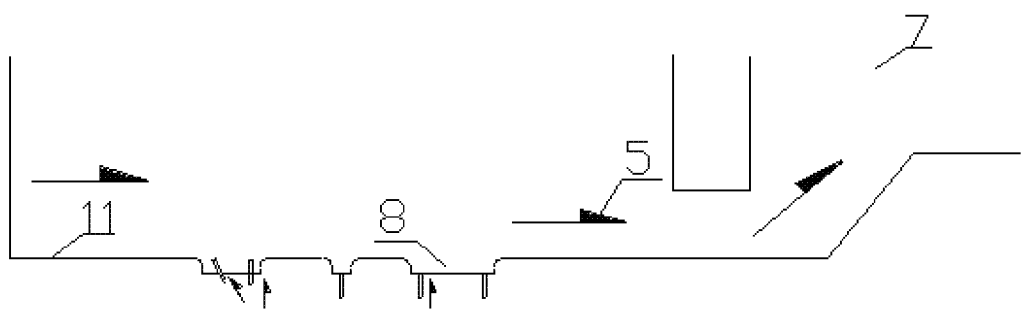
FIG. 8 is a sectional view of the arrangement structure for bubbling apparatuses of a furnace in Embodiment 12.

Referring to FIGS. 7 and 8, the arrangement structure for bubbling apparatuses of a furnace includes three arrangement sets which are disposed at 1/3 length, 1/2 length and 2/3 length of the melting pool, respectively, the bubbling tubes in each arrangement sets are disposed within a bubbling tank, and the bubbling tanks 8 are arranged in a recessed fashion. The first arrangement set is disposed at 1/3 length of the melting pool, wherein the bubbling tank 8 is 400 mm lower than the bottom plane of the melting pool, the bubbling tubes 9 are arranged in two rows before and after the position at 1/3 length of the melting pool in a staggered manner and vertically inserted into reserved holes formed on the bottom of the bubbling tank, and the top of each of the bubbling tubes 9 is 300 mm lower than the bottom plane of the melting pool.

The second arrangement set is disposed at 2/3 length of the melting pool, wherein the bubbling tank 8 is 300 mm lower than the bottom plane of the melting pool; the bubbling tubes 9 are arranged in two rows before and after the position at 2/3 length of the melting pool in a staggered manner; one row of bubbling tubes 9 close to the feed inlet 2 is obliquely inserted into reserved holes formed on the bottom of the bubbling tank 8 in a direction opposite to the flow direction of the molten glass, and the angle between the oblique bubbling tube and the vertical plane is 15°, and the top of each of the bubbling tubes 9 is 200 mm lower than the bottom plane of the melting pool; and, one row of bubbling tubes 9 away from the feed inlet 2 is vertically inserted into reserved holes formed on the bottom of the bubbling tank 8, and the top of each of the bubbling tubes 9 is 250 mm lower than the bottom plane of the melting pool.

The third arrangement set is disposed at 1/2 length of the melting pool, wherein the bubbling tank 8 is 350 mm lower than the bottom plane of the melting pool, a row of bubbling tubes 9 is disposed at the central position at 1/2 length of the melting pool and vertically mounted on the bottom of the bubbling tank 8, and the top of each of the bubbling tubes 9 is 100 mm lower than the bottom plane of the melting pool.

Embodiment 13

A difference between this embodiment and Embodiment 5 lies in that there is a row of bubbling apparatuses disposed at 1/3 length of the melting pool.

Embodiment 14

A difference between this embodiment and Embodiment 6 lies in that there is a row of bubbling apparatuses disposed at 2/3 length of the melting pool.

Embodiment 15

A difference between this embodiment and Embodiment 12 lies in that one row of bubbling tubes 9 close to the feed inlet 2 is obliquely inserted into reserved holes formed on the bottom of the bubbling tank 8 in a direction opposite to the flow direction of the molten glass, the angle between the oblique bubbling tube and the vertical plane is 25°.

Embodiment 16

Figure 9:
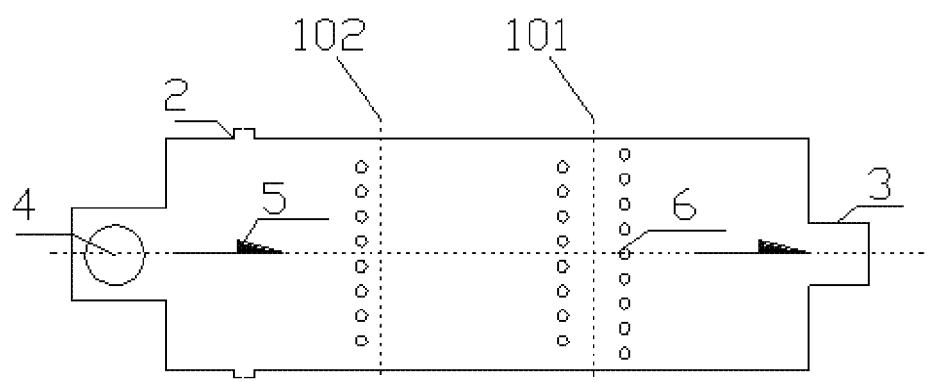
FIG. 9 is a schematic diagram of the arrangement structure for bubbling apparatuses of a furnace in Embodiment 16.
Figure 10:
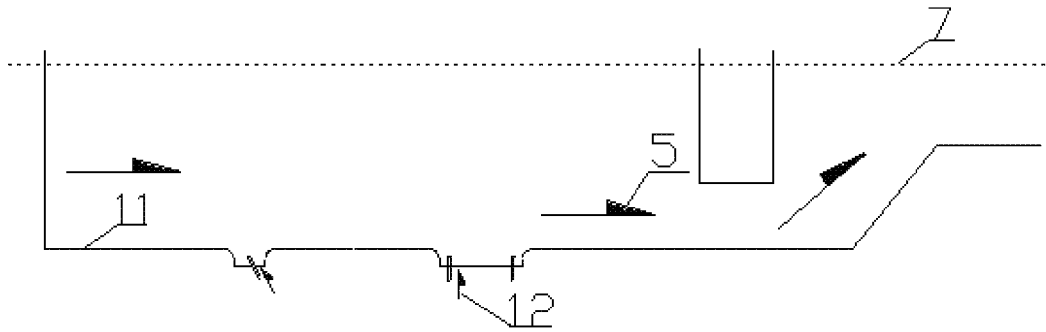
FIG. 10 is a sectional view of the arrangement structure for bubbling apparatuses of a furnace in Embodiment 16.

Referring to FIGS. 9 and 10, the arrangement structure for bubbling apparatuses of a furnace includes two arrangement sets, the bubbling tubes in each arrangement set are disposed within a bubbling tank, and the bubbling tanks 8 are arranged in a recessed fashion. The first arrangement set is located at 1/3 length of the melting pool, wherein the bubbling tank 8 is 350 mm lower than the bottom plane of the melting pool, the bubbling tubes 9 are arranged in two rows before and after the position at 1/3 length of the melting pool in a staggered manner and vertically inserted into reserved holes formed on the bottom of the bubbling tank, and the top of each of the bubbling tubes 9 is 300 mm lower than the bottom plane of the melting pool.

The second arrangement set is located at a position 600 mm before 2/3 length of the melting pool, wherein the bubbling tank 8 is 300 mm lower than the bottom plane of the melting pool, a row of bubbling tubes is obliquely inserted into reserved holes formed on the bottom of the bubbling tank 8 in a direction opposite to the flow direction of the molten glass, the angle between the oblique bubbling tube and the vertical plane is 15°, and the top of each of the bubbling tubes 9 is 250 mm lower than the bottom plane of the melting pool.

In conclusion, lots of studies on the recessed design of the bubbling apparatuses and the corresponding arrangement of the bubbling apparatuses have been carried out in the present invention. The bubbling apparatuses of the present invention has the characteristics of rational design, simple operation, safety in use and the like, and also has the following advantages in comparison with the prior art.

Firstly, the retention time of bubbles in the molten glass is increased, the counteraction of the mechanical agitation force generated by adjacent bubbles is effectively reduced, the mechanical agitation efficient of the molten glass is enhanced, and the clarification and homogenization effects of the molten glass are improved.

Secondly, the insertion depth of the bubbling tubes into the bubbling tanks is effectively controlled and the bubbling tubes will not be bent or fractured, and the usage amount of noble metals is also reduced.

Thirdly, by decreasing temperature of the molten glass in the bubbling tanks, it is advantageous to prolong the service life of the bubbling tubes and the bubbling tank bricks.

The contents described above can be implemented independently or jointly in various ways, and these transformations shall fall into the protection scope of the present invention.

Finally, it is to be noted that the foregoing embodiments are merely used for describing the technical solutions of the present invention and not intended to constitute any limitations thereto. Although the present invention has been described in detail by the foregoing embodiments, it should be understood that a person of ordinary skill in the art can make modifications to the technical solutions recorded in the foregoing embodiments or equivalent replacements to some of the technical features, and these modifications or replacements shall not make the essence of the corresponding technical solutions depart from the spirit and scope of the technical solutions in the embodiments of the present invention.

INDUSTRIAL APPLICABILITY

The arrangement structure for bubbling apparatuses of a furnace in the present invention employs a recessed arrangement where the bubbling tanks are arranged in a recessed fashion to be lower than the bottom plane of the melting pool, and the bubbling tubes are mounted within the bubbling tanks. By this design, the distance between the bottom of each of the bubbling apparatuses and the level of the molten glass is increased, and the retention time of bubbles staying in the molten glass is increased. Accordingly, it is more advantageous for the volume expansion of the gas when heated, and the agitation effect of the molten glass is enhanced. Moreover, the arrangement of the recessed bubbling apparatuses and the mounting of the bubbling tubes are further optimized in the present invention, so that both the effects of clarification and homogenization of the molten glass and the stability of production are effectively improved. The present invention has the characteristics of rational design, simple operation, safety in use and the like.

The invention claimed is:

1. An arrangement structure for bubbling apparatuses of a furnace, comprising bubbling apparatuses disposed in a melting pool of the furnace, each of the bubbling apparatuses comprises a bubbling tank and a bubbling tube; the bubbling tank is provided at the bottom of the melting pool and disposed in a recessed fashion; and, the bubbling tube is mounted in the bubbling tank, the bubbling apparatuses are vertically arranged at certain intervals along a direction perpendicular to the length of the melting pool, wherein, the bottom of each of the bubbling tanks is 50 mm to 350 mm lower than the bottom plane of the melting pool.

2. The arrangement structure for bubbling apparatuses of a furnace according to claim 1, wherein, the arrangement structure comprises N arrangement sets, each arrangement set includes M rows of bubbling apparatuses, wherein each arrangement set is located at an average position of the M rows of bubbling apparatuses in a lengthwise direction of the melting pool, where both N and M are integers greater than or equal to 1; and the melting pool of the furnace includes the following three position intervals along its length L: [0.277L, 0.388L], [0.444L,0.555L] and [0.611L,0.722L], and the N arrangement sets are located within one or more of the three position intervals.

3. The arrangement structure for bubbling apparatuses of a furnace according to claim 2, wherein, at least one set of the N arrangement sets is located at 1/3 length of the melting pool, 1/2 length of the melting pool or 2/3 length of the melting pool.

4. The arrangement structure for bubbling apparatuses of a furnace according to claim 1, wherein, the arrangement structure comprises two rows of bubbling apparatuses which are located at 1/3 length of the melting pool or 2/3 length of the melting pool.

5. The arrangement structure for bubbling apparatuses of a furnace according to claim 1, wherein, the arrangement structure comprises two rows of bubbling apparatuses which are respectively located at a position before 1/3 length of the melting pool or 2/3 length of the melting pool or a position after 1/3 length of the melting pool or 2/3 length of the melting pool, and an average position of the two rows of bubbling apparatuses is a position at 1/3 length of the melting pool or a position at 2/3 length of the melting pool.

6. The arrangement structure for bubbling apparatuses of a furnace according to claim 1, wherein, the arrangement structure comprises two rows of bubbling apparatuses which are respectively located at a position before 1/3 length of the melting pool or 2/3 length of the melting pool or a position after 1/3 length of the melting pool or 2/3 length of the melting pool, and the two rows of bubbling apparatuses are disposed in a staggered manner with a distance of 800 mm to 2000 mm between them.

7. The arrangement structure for bubbling apparatuses of a furnace according to claim 2, wherein, the N arrangement sets comprise N bubbling tanks, and each arrangement set includes M rows of bubbling tubes, the M rows of bubbling tubes are disposed in a same bubbling tank.

8. The arrangement structure for bubbling apparatuses of a furnace according to claim 2, wherein, the arrangement structure comprises two arrangement sets which are respectively located at 1/3 length of the melting pool and 2/3 length of the melting pool, and M is 1 or 2.

9. The arrangement structure for bubbling apparatuses of a furnace according to claim 2, wherein, the arrangement structure comprises two arrangement sets which are respectively located at a position before 1/3 length of the melting pool and after 1/3 length of the melting pool, a distance between a front arrangement set and a back arrangement set is 800 mm to 2000 mm, and M is 1 or 2;

or, the two arrangement sets are respectively located at a position before 2/3 length of the melting pool and after 2/3 length of the melting pool, a distance between a front arrangement set and a back arrangement set is 800 mm to 2000 mm, and M is 1 or 2.

10. The arrangement structure for bubbling apparatuses of a furnace according to claim 1, wherein, the adjacent rows of the bubbling apparatuses are disposed in a staggered manner, and a distance between the adjacent rows is 800 mm to 2000 mm.

11. The arrangement structure for bubbling apparatuses of a furnace according to claim 7, wherein, the M rows of bubbling tubes are disposed in a staggered manner, and a distance between adjacent rows is 1000 mm to 1800 mm.

12. The arrangement structure for bubbling apparatuses of a furnace according to claim 1, wherein, the top of each of the bubbling tubes is 50 mm to 350 mm lower than the bottom plane of the melting pool.

13. The arrangement structure for bubbling apparatuses of a furnace according to claim 2, wherein, the top of each of the bubbling tubes is 100 mm to 300 mm lower than the bottom plane of the melting pool.

14. The arrangement structure for bubbling apparatuses of a furnace according to claim 1, wherein, one row of bubbling tubes closest to a feed inlet is mounted along a direction opposite to the flow direction of the molten glass at a first predetermined angle, the first predetermined angle deviates from a vertical plane by 0° to 40°.

15. The arrangement structure for bubbling apparatuses of a furnace according to claim 14, wherein, the first predetermined angle deviates from the vertical plane by 5° to 40°.

16. The arrangement structure for bubbling apparatuses of a furnace according to claim 2, wherein, the bottom of each of the bubbling tanks in an arrangement set positioned within an position interval [0.305L, 0.361L] is 50 mm to 350 mm lower than the bottom plane of the melting pool; and the bottom of each of the bubbling tanks in an arrangement set positioned within an position interval [0.638L, 0.694L] is 50 mm to 350 mm lower than the bottom plane of the melting pool.

17. The arrangement structure for bubbling apparatuses of a furnace according to claim 3, wherein, the positions of the N arrangement sets comprise a position at 1/3 length of the melting pool and a position at 2/3 length of the melting pool, and a recessed distance of the top of each of the bubbling tubes disposed at the position at 1/3 length of the melting pool is greater than a recessed distance of the top of each of the bubbling tubes disposed at the position at 2/3 length of the melting pool, the recessed distance is a distance below the bottom plane of the melting pool.

18. The arrangement structure for bubbling apparatuses of a furnace according to claim 3, wherein, the positions of the N arrangement sets comprise a position at 1/3 length of the melting pool and a position at 2/3 length of the melting pool, and a recessed distance of the bottom of each of the bubbling tanks disposed at the position at 1/3 length of the melting pool is greater than a recessed distance of the bottom of each of the bubbling tanks disposed at the position at 2/3 length of the melting pool, the recessed distance is a distance below the bottom plane of the melting pool.

19. The arrangement structure for bubbling apparatuses of a furnace according to claim 1, wherein, a distance between adjacent bubbling tubes in a same row of bubbling tubes is 300 mm to 800 mm.

* * * * *